United States Patent
Fujimoto

(10) Patent No.: US 9,438,766 B2
(45) Date of Patent: Sep. 6, 2016

(54) INFORMATION PROCESSING APPARATUS, INFORMATION PROCESSING METHOD

(71) Applicant: KYOCERA Document Solutions Inc., Osaka-shi, Osaka (JP)

(72) Inventor: Norie Fujimoto, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/899,547

(22) PCT Filed: Jun. 19, 2015

(86) PCT No.: PCT/JP2015/067775
§ 371 (c)(1),
(2) Date: Dec. 17, 2015

(87) PCT Pub. No.: WO2016/017320
PCT Pub. Date: Feb. 4, 2016

(65) Prior Publication Data
US 2016/0205284 A1    Jul. 14, 2016

(30) Foreign Application Priority Data
Jul. 28, 2014  (JP) ................... 2014-153192

(51) Int. Cl.
*G06F 15/00* (2006.01)
*G06K 1/00* (2006.01)
(Continued)

(52) U.S. Cl.
CPC ........ *H04N 1/3876* (2013.01); *G06K 9/00221* (2013.01); *G06K 9/00335* (2013.01);
(Continued)

(58) Field of Classification Search
CPC .. G06F 3/1296; G06F 3/1297; G06F 3/1293; G06K 15/00; G06K 15/02; G06K 15/16; H04N 1/00204; H04N 1/3876; H04N 1/00251; H04N 1/442; H04N 1/00801; H04N 1/00809; H04N 1/2137; H04N 2201/0094; H04N 2201/0098; H04N 2201/0065

USPC .................................................. 358/1.1–1.18
See application file for complete search history.

(56) References Cited

U.S. PATENT DOCUMENTS

| | | | | |
|---|---|---|---|---|
| 2005/0021618 A1* | 1/2005 | Isozaki | ................. | G06F 3/0481 709/204 |
| 2007/0064278 A1 | 3/2007 | Sugimoto | | |
| 2013/0162672 A1* | 6/2013 | Sen | ........................ | G09G 5/377 345/632 |

FOREIGN PATENT DOCUMENTS

| | | |
|---|---|---|
| JP | 2004234500 A | 8/2004 |
| JP | 2007082085 A | 3/2007 |

(Continued)

*Primary Examiner* — Douglas Tran
(74) *Attorney, Agent, or Firm* — Alleman Hall McCoy Russell & Tuttle LLP

(57) ABSTRACT

An information processing apparatus (1) includes a photographing portion (8), an authentication processing portion (91), and a layout processing portion (92). The authentication processing portion (91) determines, based on a photographed image obtained from the photographing portion (8), whether a face image of a person is included in the photographed image, and upon determining that a face image of a person is included, performs an authentication process of the person based on the face image of the person. The layout processing portion (92), when the authentication processing portion (91) has successfully authenticated the person, determines whether a layout specification image specifying a page layout is included in the photographed image, and upon determining that a layout specification image is included in the photographed image, creates a composite image by laying out one or more material images in accordance with the page layout specified by the layout specification image.

8 Claims, 13 Drawing Sheets

(51) Int. Cl.
   *G06K 15/00* (2006.01)
   *H04N 1/387* (2006.01)
   *H04N 1/00* (2006.01)
   *H04N 1/44* (2006.01)
   *H04N 1/21* (2006.01)
   *G06K 9/00* (2006.01)
(52) U.S. Cl.
   CPC ...... *H04N1/00251* (2013.01); *H04N 1/00801* (2013.01); *H04N 1/00809* (2013.01); *H04N 1/2137* (2013.01); *H04N 1/442* (2013.01); *H04N 2201/0065* (2013.01); *H04N 2201/0094* (2013.01); *H04N 2201/0098* (2013.01)

(56) References Cited

FOREIGN PATENT DOCUMENTS

JP  2008092317 A  4/2008
JP  2013083689 A  5/2013

* cited by examiner

FIG. 4

| IMAGE ID INFORMATION | USER ID INFORMATION |
|---|---|
| IMAGE 1 | USER 1 |
| IMAGE 2 | USER 2 |
| IMAGE 2 | USER 3 |
| ⋮ | ⋮ |

FIG. 11

| IMAGE ID INFORMATION | GESTURE ID INFORMATION | LAYOUT PATTERN ID INFORMATION |
|---|---|---|
| IMAGE 1 | GESTURE 1 | LAYOUT 1 |
| ↑ | GESTURE 2 | LAYOUT 2 |
| ↑ | GESTURE 3 | LAYOUT 3 |
| ⋮ | ⋮ | ⋮ |
| IMAGE 2 | GESTURE 4 | LAYOUT 4 |
| ↑ | GESTURE 5 | LAYOUT 5 |
| ↑ | GESTURE 6 | LAYOUT 6 |
| ⋮ | ⋮ | ⋮ |
| IMAGE 3 | GESTURE 7 | LAYOUT 7 |
| ↑ | GESTURE 8 | LAYOUT 8 |
| ↑ | GESTURE 9 | LAYOUT 9 |
| ⋮ | ⋮ | ⋮ |

INFORMATION PROCESSING APPARATUS, INFORMATION PROCESSING METHOD

TECHNICAL FIELD

The present invention relates to an information processing apparatus and an information processing method for printing a composite image in which desired images are arbitrarily laid out.

BACKGROUND ART

There has been known an image forming apparatus with an image combining function for obtaining a printed matter with a composite image printed thereon, the composite image created by the user by arbitrarily laying out desired images (see, for example, PTL 1 identified below). The image forming apparatus allows an image reading portion to read a predetermined sheet that has been generated by the user. On the predetermined sheet, frame lines have been handwritten to define closed regions in which the desired images are to be framed. In each of the closed regions, an image number assigned to an image is written. The image forming apparatus reads, from a predetermined storage portion, images assigned with the image numbers written in the closed regions, and creates a composite image by inserting the read images into the closed regions. Subsequently, the image forming apparatus prints the composite image.

On the other hand, a user authentication function may be installed in an image forming apparatus, wherein the user authentication function performs an authentication process to determine, when a user attempts to use the image forming apparatus, whether or not it is permitted to accept an input of a print job from the user, based on user identification information input by the user.

CITATION LIST

Patent Literature

[PTL 1] Japanese Laid-Open Patent Publication No. 2008-92317

SUMMARY OF THE INVENTION

Problems to be Solved by the Invention

In the image forming apparatus which includes the authentication function and the image combining function, a situation may occur where the image combining function is used immediately after the user authentication is made. In that case, the user needs to input the identification information of him/herself for authentication, and then soon perform an input work in which the user needs to cause the image forming apparatus to read the above-mentioned predetermined sheet so as to store an image read from the sheet so that the image combining function can be used. This procedure is troublesome to the user.

The present invention has been made in view of such conventional circumstances, and it is an object of the present invention to provide an information processing apparatus and an information processing method which improve the usability of the user authentication function and the image combining function.

Solution to the Problems

An information processing apparatus according to an aspect of the present invention includes a photographing portion, an authentication processing portion, and a layout processing portion. The authentication processing portion determines, based on a photographed image obtained from the photographing portion, whether or not a face image of a person is included in the photographed image, and upon determining that a face image of a person is included in the photographed image, performs an authentication process of the person based on the face image of the person. The layout processing portion, when the authentication processing portion has successfully authenticated the person, determines whether or not a layout specification image specifying a page layout is included in the photographed image, and upon determining that a layout specification image is included in the photographed image, creates a composite image by laying out one or more material images in accordance with the page layout specified by the layout specification image.

An information processing method according to another aspect of the present invention includes a first step and a second step. The first step determines, based on a photographed image obtained from a photographing portion, whether or not a face image of a person is included in the photographed image, and upon determining that a face image of a person is included in the photographed image, performs an authentication process of the person based on the face image of the person. The second step, when the first step has successfully authenticated the person, determines whether or not a layout specification image specifying a page layout is included in the photographed image, and upon determining that a layout specification image is included in the photographed image, creates a composite image by laying out one or more material images in accordance with the page layout specified by the layout specification image.

Advantageous Effects of the Invention

According to the present invention, it is possible to realize an information processing apparatus and an information processing method which improve the usability of the user authentication function and the image combining function.

BRIEF DESCRIPTION OF THE DRAWINGS

FIG. 4 is a diagram showing correspondence relationship between image identification information and user identification information.

FIG. 11 is a table showing correspondence relationship among image identification information for identifying comparison images, gesture identification information for identifying gestures, and layout pattern identification information for identifying layout patterns.

DESCRIPTION OF EMBODIMENTS

The following describes an information processing apparatus according to an embodiment of the present invention with reference to the accompanying drawings. It should be noted that the following description is an example of a specific embodiment of the present invention and should not limit the technical scope of the present invention.

Figure 1:
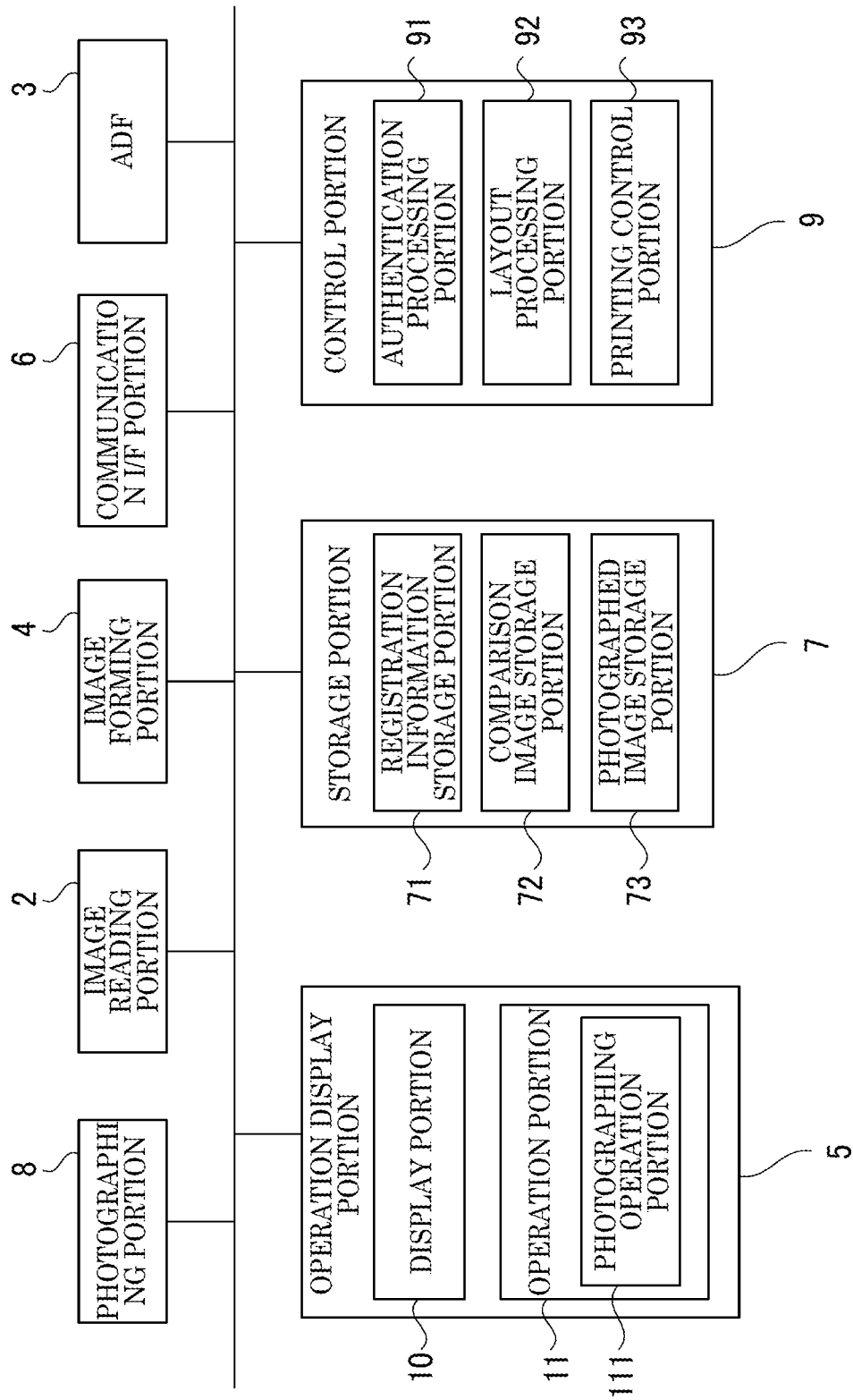
FIG. 1 is a block diagram showing an example of an electric configuration of an information processing apparatus according to an embodiment of the present invention.

First, an outlined configuration of an image forming apparatus 1 is described with reference to FIG. 1, the image forming apparatus 1 being an embodiment of the information processing apparatus of the present invention. The image forming apparatus 1 is a multifunction peripheral having a plurality of functions such as an image reading function, a facsimile function, and an image forming function. As shown in FIG. 1, the image forming apparatus 1 includes an image reading portion 2, an automatic document sheet feeding devide (ADF) 3, an image forming portion 4, an operation display portion 5, a communication interface (I/F) portion 6, a storage portion 7, a photographing portion 8, and a control portion 9 that controls these portions. It is noted that although the image forming apparatus 1 which is a multifunction peripheral is described as an example of the image forming apparatus of the present invention, the present invention is not limited to this. For example, a smartphone, a printer, a facsimile apparatus, or a copier may be the information processing apparatus of the present invention.

The image reading portion 2 includes a contact glass, a LED light source, a plurality of mirrors, an optical lens, and a CCD. The ADF 3 includes a document sheet setting portion, a plurality of conveyance roller pairs, and a sheet discharge portion. The ADF 3 drives the conveyance roller pairs so as to cause a document sheet that has been set on the document sheet setting portion, to pass through a reading position on the contact glass and be conveyed to the sheet discharge portion. The image forming portion 4 includes a photoconductor drum, a charging portion, a developing portion, a toner container, a transfer roller, an electricity removing portion, a fixing roller, and a pressure roller.

The operation display portion 5 includes a display portion 10 and an operation portion 11. The display portion 10 includes, for example, a color liquid crystal display and displays various types of information to the user who is operating the operation display portion 5. The storage portion 7 includes a nonvolatile memory such as an EEPROM. The operation portion 11 includes various push button keys and a touch panel sensor, and various types of instructions are input through the operation portion 11 by the user of the image forming apparatus 1, wherein the push button keys are arranged adjacent to the display portion 10, and the touch panel sensor is arranged on a display screen of the display portion 10. The operation portion 11 includes a photographing operation portion 111 which is used by the user to input an instruction to the photographing portion 8 to perform a photographing operation. When the user performs an operation on the operation display portion 5, an operation signal of that operation is output from the operation display portion 5 to the control portion 9.

The photographing portion 8 includes a CCD and a photographing optical system. The photographing optical system includes opetical elements such as a lens that guides light from a photographic object to the CCD. The CCD receives the light guided by the photographing optical system and generates a pixel signal that corresponds to the amount of the received light, by performing the photoelectric conversion. An image processing circuit (not shown) performs image processing onto the pixel signal generated by the CCD. The image processing circuit performs a γ (gamma) correction process, a color correction process, a color conversion process and the like, wherein in the color correction process, the RGB color balance is adjusted, and in the color conversion process, a conversion from RGB data to CMYK data is made. A photographed image is composed of the pixel signals after the image processing, and is stored in a photographed image storage portion 73 that is described below.

The control portion 9 includes a CPU, a ROM, and a RAM. The control portion 9 controls the operation of the image forming apparatus 1 as the CPU executes programs stored in the ROM. Processing programs are stored in advance in the ROM of the control portion 9, wherein the processing programs cause the CPU of the control portion 9 to execute processes that are described below (see flowcharts shown in FIG. 4 and FIG. 5). It is noted that the processing programs may be recorded on a computer-readable recording medium such as a CD, a DVD, or a flash memory and installed from the recording medium onto a storage portion such as the EEPROM of the control portion 9 or a hard disk (not shown).

Meanwhile, the image forming apparatus 1 of the present embodiment has an image combining function for creating a composite image by allowing the user to arbitrarily lay out, into one image, the images that have been read by the image reading portion 2. In addition, the image forming apparatus 1 of the present embodiment has a user authentication function for performing an authentication to determine, when a user attempts to use the image forming apparatus 1, whether or not it is permitted to accept an input of a print job from the user, based on the user identification information input by the user. In the image forming apparatus 1 which includes the image combining function and the user authentication function, a situation may occur where the image combining function is used immediately after the user authentication is made. In that case, the user needs to input the identification information of him/herself for authentication, and then soon perform an input work in which the user needs to cause the image forming apparatus to read the above-mentioned predetermined sheet so as to store an image read from the sheet so that the image combining function can be used. This procedure is troublesome to the user. In contrast, the image forming apparatus 1 of the present embodiment is configured to improve the usability of the user authentication function and the image combining function.

Specifically, as shown in FIG. 1, the storage portion 7 includes a registration information storage portion 71, a comparison image storage portion 72, and a photographed image storage portion 73. The registration information storage portion 71 stores user identification information. In the present embodiment, only a user whose user identification information is stored in the registration information storage portion 71 can use the image forming apparatus 1, namely, can input various types of jobs including a print job. The comparison image storage portion 72 stores, in advance, a face image of the user, whose user identification information is stored in the registration information storage portion 71, as a comparison image that is used in the user authentication. As shown in FIG. 4, identification information of the comparison image (image identification information) is stored in the registration information storage portion 71 in association with the user identification information. The photographed image storage portion 73 stores a photographed image which is photographed during the user authentication by the photographing portion 8.

The control portion 9 functions as an authentication processing portion 91, a layout processing portion 92, and a printing control portion 93 by executing, by using the CPU, various types of processes in accordance with the processing programs. It is noted that in another embodiment, one or more functions of the control portion 9 may be provided as an electronic circuit.

Figure 3:
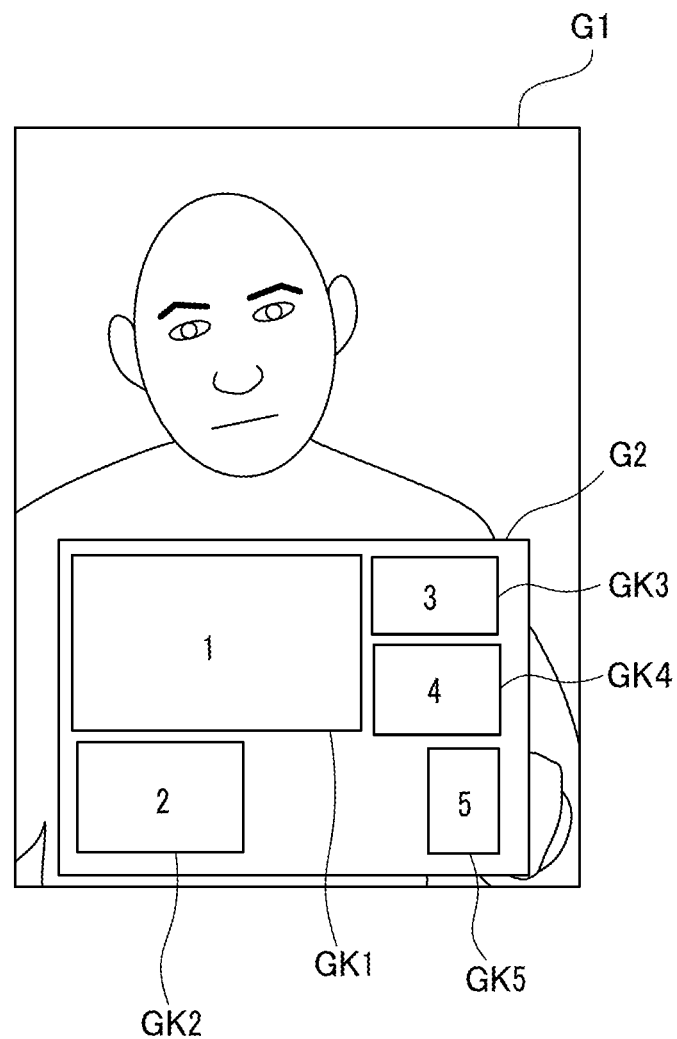
FIG. 3 is a diagram of a photographed image of a layout document sheet photographed by a photographing portion.

The authentication processing portion 91 determines whether or not a face image of a person is included in the photographed image, based on the photographed image obtained from the photographing portion 8 (see image G1 of FIG. 3). Upon determining that a face image of a person is included in the photographed image, the authentication processing portion 91 performs an authentication process of the person based on the face image of the person and the comparison image.

The layout processing portion 92, when the authentication processing portion 91 has successfully authenticated the person, determines whether or not an image (see image G2 of FIG. 3) of a layout document sheet L1 (see FIG. 2) is included in the photographed image. Upon determining that an image of the layout document sheet L1 is included in the photographed image, the layout processing portion 92 creates a composite image by laying out the read images in accordance with a page layout specified by the image. The image of the layout document sheet L1 is an example of the layout specification image of the present invention. The read images are an example of the material images of the present invention. The material images may be images created with a personal computer (PC), images photographed by a camera or the like, or images obtained from the Internet.

The printing control portion 93, after the composite image is created by the layout processing portion 92, causes the image forming portion 4 to print out the composite image.

Figure 5:
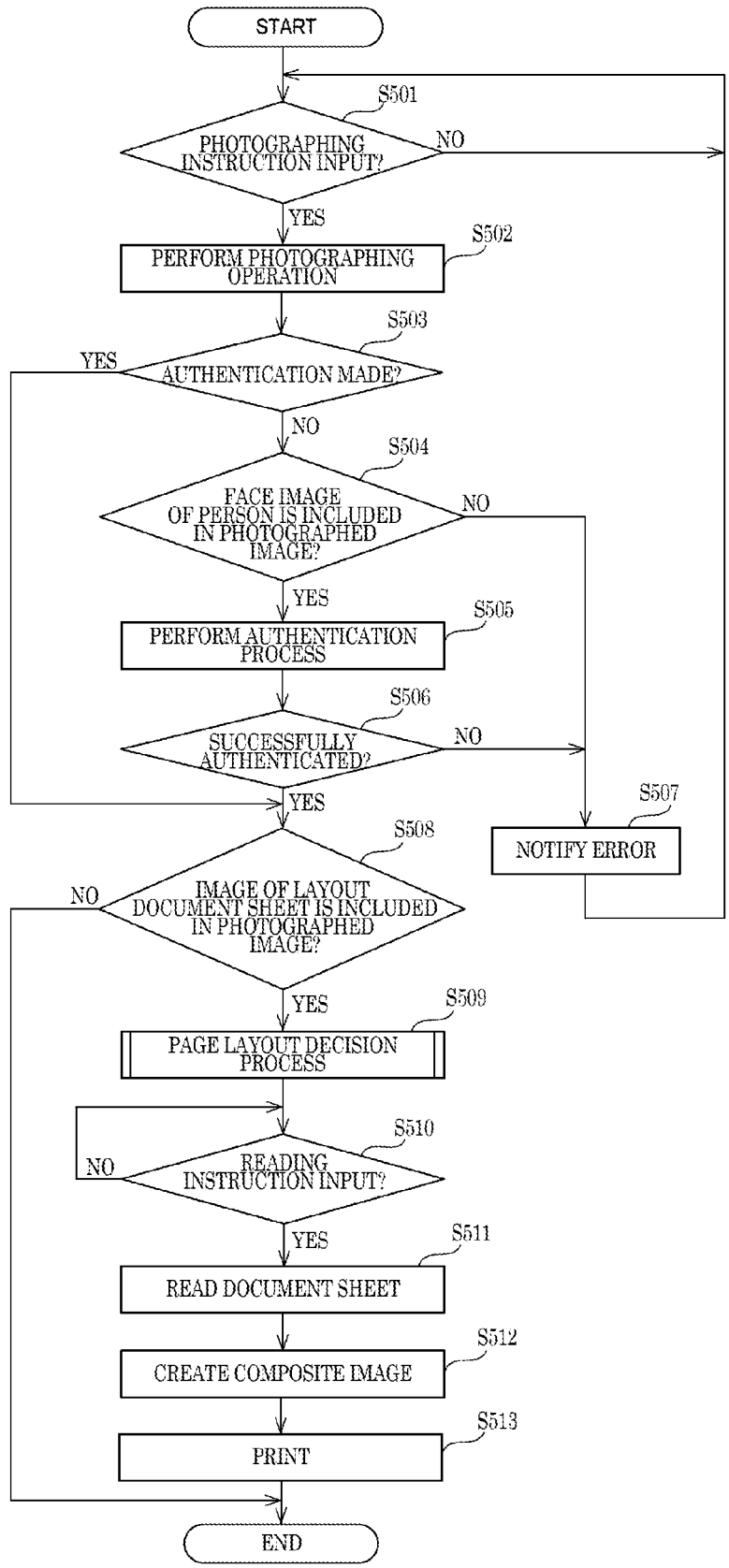
FIG. 5 is a flowchart showing a flow of a series of processes including an authentication process and an image combining process performed by a control portion.
Figure 6:
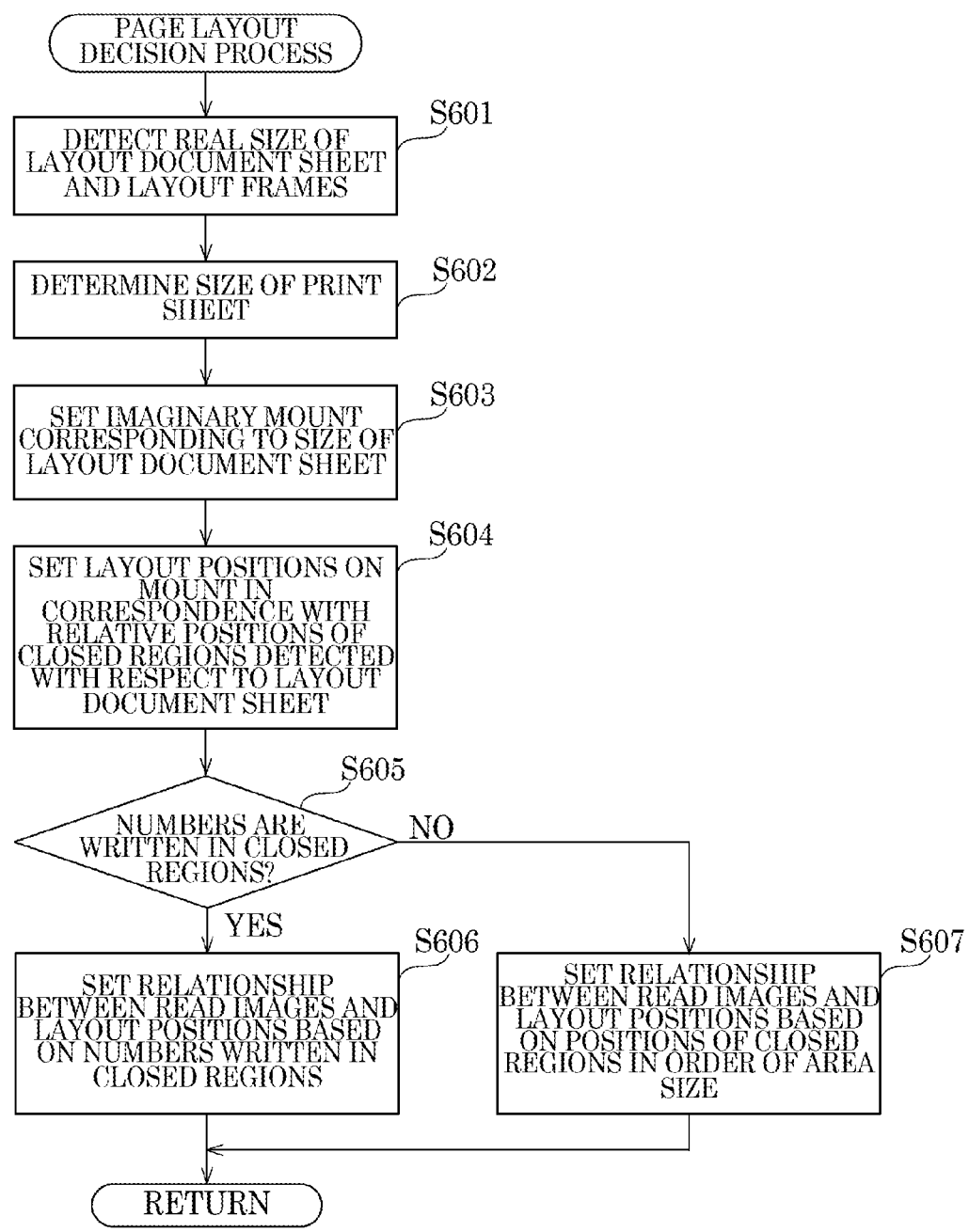
FIG. 6 is a flowchart showing a flow of a series of processes including an authentication process and an image combining process performed by a control portion.

The following describes an example of the procedure of the process that is executed by the control portion 9, with reference to FIG. 5 and FIG. 6. Here, steps S501, S502, . . . that appear in the flowcharts of FIG. 5 and FIG. 6 represent numbers assigned to the processing procedures (steps).

<Step S501>

In step S501, the control portion 9 determines whether or not a photographing instruction has been input by a user operation performed on the photographing operation portion 111 of the operation portion 11. Upon determining that a photographing instruction has not been input (NO in step S501), the control portion 9 performs the determination after a predetermined time passes. On the other hand, upon determining that a photographing instruction has been input (YES in step S501), the control portion 9 allows the process to proceed to step S502.

<Step S502>

In step S502, the control portion 9 causes the photographing portion 8 to perform a photographing operation. A photographed image that is generated by the photographing operation is subjected to the image processing performed by the image processing circuit, and the result image is stored in the photographed image storage portion 73. Here, it is supposed that photographed image G1 shown in FIG. 3 is the photographed image.

<Step S503>

In step S503, the authentication processing portion 91 determines whether or not authentication has been made. Upon determining that authentication has been made (YES in step S503), the authentication processing portion 91 skips the processes of steps S504-S507, and allows the process to proceed to step S508. On the other hand, upon determining that authentication has not been made (NO in step S503), the authentication processing portion 91 allows the process to proceed to step S504.

<Step S504>

Figure 7A:
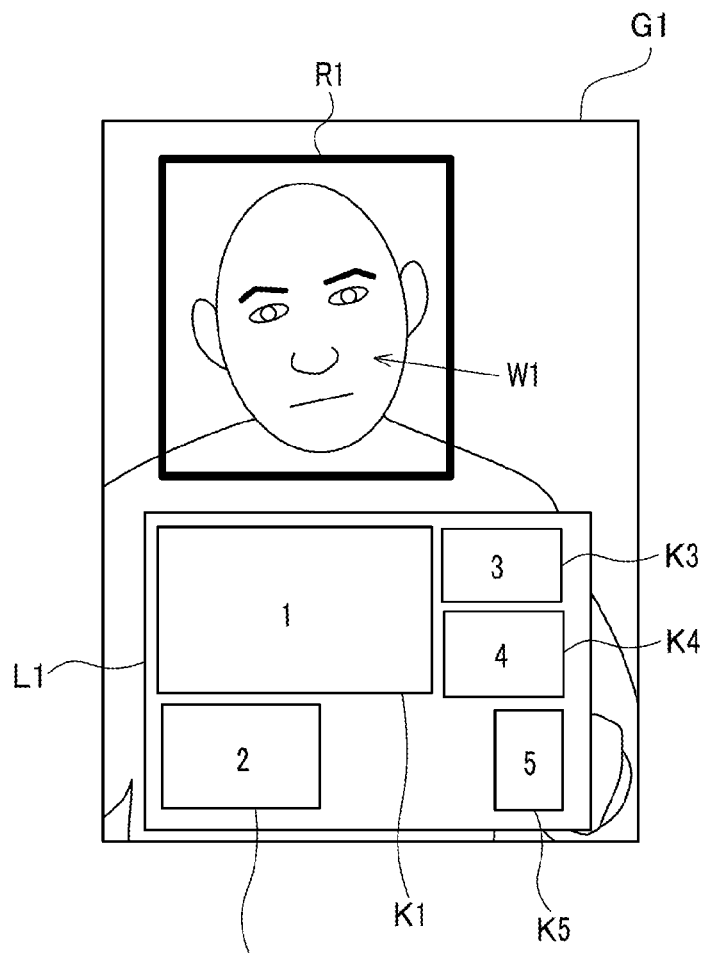
FIG. 7A is a diagram showing an example of a photographed image.

In step S504, the authentication processing portion 91 reads the photographed image G1 from the photographed image storage portion 73, and determines whether or not a face image of a person is included in the photographed image G1. Specifically, the authentication processing portion 91 determines whether or not a region W1 (see FIG. 7A) is present in the photographed image G1, wherein the region W1 is a region including the eyes, mouth, jaw, eyebrows, and contour of the face. Upon determining that the region W1 is present (YES in step S504), the authentication processing portion 91 determines that a face image of the person is included in the photographed image G1, and allows the process to proceed to step S505. On the other hand, upon determining that the region W1 is not present (NO in step S504), the authentication processing portion 91 determines that a face image of the person is not included in the photographed image G1, and allows the process to proceed to step S507.

<Step S505>

In step S505, the authentication processing portion 91 performs the authentication process so as to determine whether or not the person included in the photographed image G1 is a registered user of the image forming apparatus 1. The authentication processing portion 91 determines an image included in the region W1 as a face image of the person, and extracts an image R1 included in a rectangular region surrounding the region W1 (see FIG. 7A). In the following, the extracted image R1 is referred to as an extracted image R1. Subsequently, the authentication processing portion 91 makes a comparison between the extracted image R1 and the comparison image stored in the comparison image storage portion 72.

Figure 7B:
FIG. 7B is a diagram showing a processing method of the authentication process.
Figure 7C:
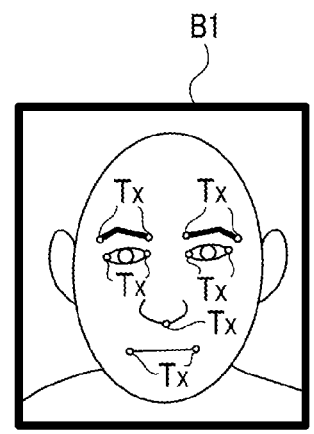
FIG. 7C is a diagram for explaining a processing method of the authentication process.

Specifically, the authentication processing portion 91 detects, based on the extracted image R1, characteristic points T1 that are, for example, the eyes, ends of eyebrows, ends of the mouth, and tip of the nose (see FIG. 7B) from the face of the person included in the extracted image R1. Subsequently, the authentication processing portion 91 obtains a numerical value which represents a level of match between the two images by using a predetermined formula, based on, for example, relationship between the positional relationship among the characteristic points T1 and the positional relationship among characteristic points Tx in the comparison image B1.

<Step S506>

Upon determining in step S506 that the numerical value representing the level of match is equal to or lower than a predetermined value (NO in step S506), the authentication processing portion 91 determines that the authentication failed, and the control portion 9 determines not to accept an input of a job, and allows the process to proceed to step S507. On the other hand, upon determining that the numerical value representing the level of match is higher than the predetermined value (YES in step S506), the authentication processing portion 91 determines to accept inputs of jobs thereafter, and allows the process to proceed to step S508. In this way, when a registered user starts to use the image forming apparatus 1, the user needs to photograph his/her face by the photographing portion 8.

<Step S507>

In step S507, the control portion 9 notifies an error indicating an authentication failure. This error notification is implemented through a display by the display portion 10 and a sound/voice output by a sound/voice output portion (not shown). The control portion 9 returns to the process of step S501 after the process of step S507.

<Step S508>

Figure 2:
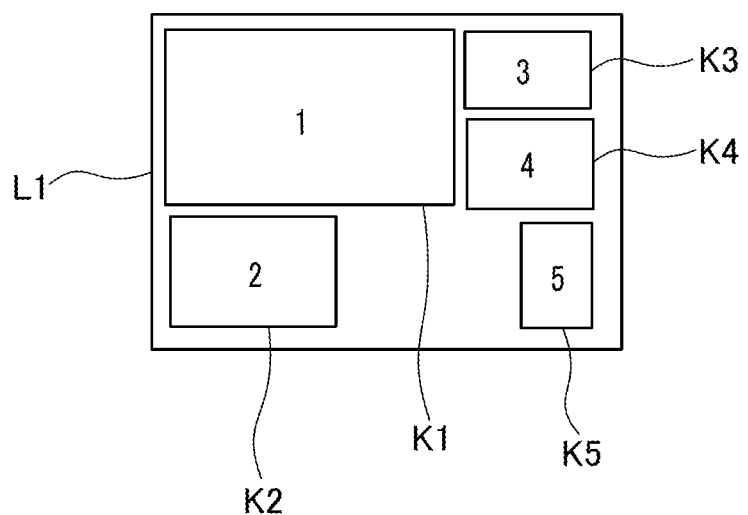
FIG. 2 is an outer appearance diagram of a layout document sheet.

In step S508, the layout processing portion 92 determines whether or not an image G2 of the layout document sheet L1 is included in the photographed image G1 (see FIG. 3). The layout document sheet L1 is generated by the user before the photographing. On the layout document sheet L1, layout frames K1-K5 that form closed regions are written by the user. It is noted that although FIG. 2 shows the layout document sheet L1 in which five layout frames K1-K5 are written, the number of the layout frames written in the layout document sheet is not limited to five. The positions of the layout frames K1-K5 in the layout document sheet L1 specify the layout positions of the read images in the composite image, that is, specify the page layout. The detection of the image G2 from the layout document sheet L1 can be implemented by, for example, the well-known edge detection process. Upon determining that the image G2 of the layout document sheet L1 is included in the photographed image G1 (YES in step S508), the layout processing portion 92 allows the process to proceed to step S509. On the other hand, upon determining that the image G2 of the layout document sheet L1 is not included in the photographed image G1 (NO in step S508), the layout processing portion 92 ends the series of processes.

<Step S509>

In step S509, the layout processing portion 92 performs a page layout decision process so as to decide the page layout of the read images, based on the image of the layout document sheet L1 detected in step S508. In the above-described situation where the user uses the image combining function immediately after receiving the authentication, the user needs to allow the photographing portion 8 to photograph his/her face together with the layout document sheet FIG. 5 is a flowchart showing the subroutine of the page layout decision process in which processes of steps S601-S607 are executed.

<Step S601>

In step S601, the layout processing portion 92 obtains the real size of the layout document sheet L1 based on: the size of the photographed image G1 and the image G2 of the layout document sheet L1; and the distance from the photographing portion 8 to the layout document sheet L1. It is noted that when a distance measurement sensor (not shown) is installed in the photographing portion 8, the distance between the photographing portion 8 and the layout document sheet L1 can be measured by using the distance measurement sensor. When a distance measurement sensor is not installed in the photographing portion 8, the distance is measured by using, for example, a known detection process in which the distance is detected based on the size of the face of the user included in the photographed image G1 and the focal distance of the photographing portion 8.

<Step S602>

In step S602, the layout processing portion 92 determines a sheet of a size that matches or is close to the real size of the layout document sheet L1, as a print sheet on which the composite image is to be printed.

<Step S603>

Figure 8A:
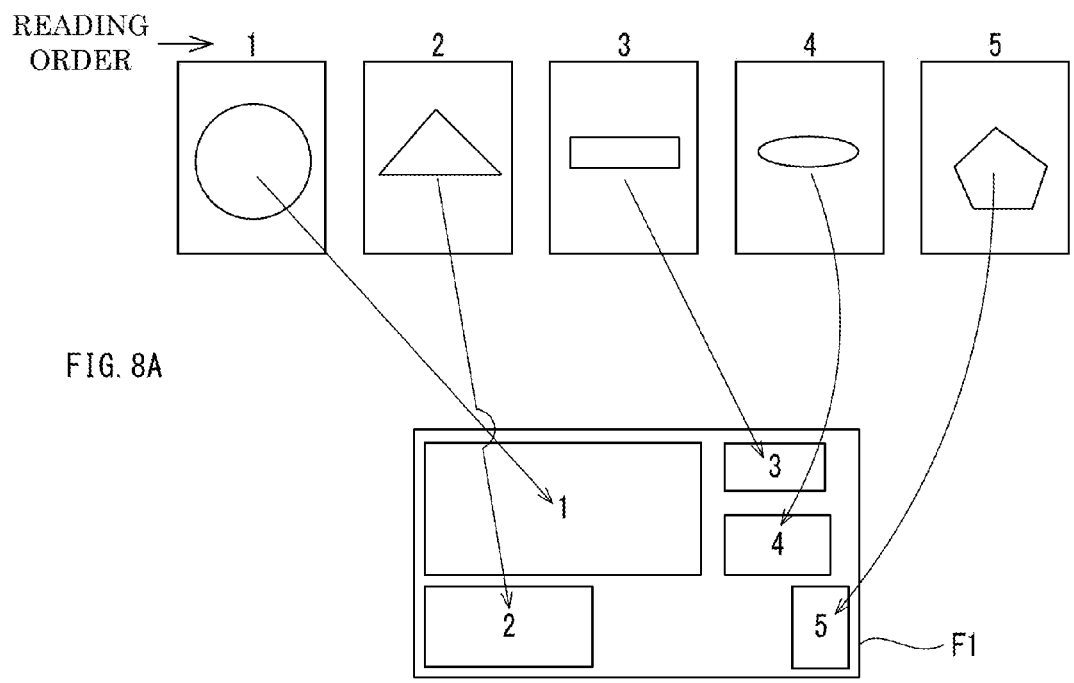
FIG. 8A is a diagram showing a state of laying out material images in an imaginary mount.
Figure 8B:
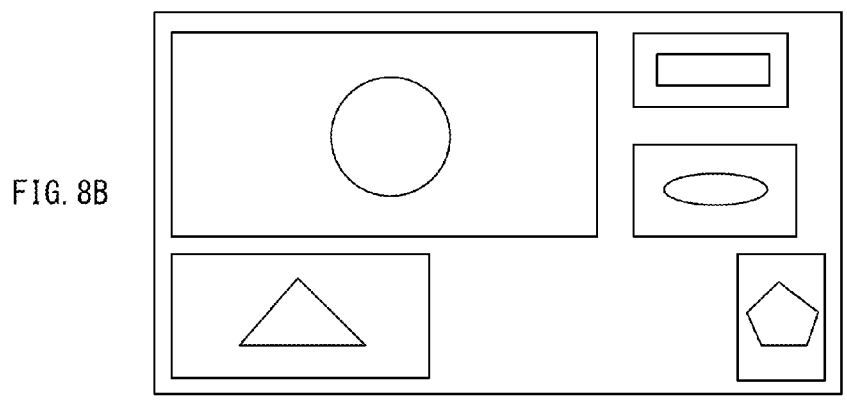
FIG. 8B shows an example of a composite image.

In step S603, the layout processing portion 92 secures, on the RAM, a storage region that has a sufficient storage capacity for storing image data that is to be printed with a predetermined resolution onto the print sheet determined in step S602, and treats the storage region as an imaginary mount F1 (see FIG. 8A and FIG. 8B).

<Step S604>

In step S604, the layout processing portion 92 detects images GK1-GK5 to be inserted in the layout frames K1-K5 that are included in the layout document sheet L1, and detects relative positions of the layout frames K1-K5, based on the image G2 of the layout document sheet L1 (see FIG. 3). The layout processing portion 92 sets layout positions on the mount F1 in correspondence with the detected relative positions.

<Step S605>

In step S605, the layout processing portion 92 determines, based on the image of the layout document sheet L1, whether or not numbers (an example of the image specification information) are written in the closed regions of the layout document sheet L1. The numbers are recognized by a known character recognition method, and detailed explanation of the character recognition method is omitted. Upon determining that numbers are written in the closed regions (YES in step S605), the layout processing portion 92 allows the process to proceed to step S606. On the other hand, upon determining that numbers are not written in the closed regions (NO in step S605), the layout processing portion 92 allows the process to proceed to step S607.

<Step S606>

In step S606, the layout processing portion 92 sets, based on the recognized numbers, correspondence relationship between the layout positions set on the mount F1 in step S604 and the read images that are to be laid out at the layout positions. In the present embodiment, as described above, the images laid out at the layout positions are read images that are to be read by the image reading portion 2 later. As a result, the read images to be laid out do not exist at this point in time, and thus the identification information of the read images that are to be laid out at the layout positions cannot be detected. Thus, in the present embodiment, the layout processing portion 92 detects, as information that specifies the read images to be laid out at the layout positions, the numbers that are written in the closed regions and indicate the order in which the read images are read. The layout processing portion 92 determines what read images are to be laid out at the layout positions based on the supposition that the detected numbers indicate at what numbers the images are read by the image reading portion 2. With this operation, the page layout is decided.

<Step S607>

In step S607, the layout processing portion 92 sets, based on a predetermined rule (in the present embodiment, the positions of the closed regions in the order of area size), correspondence relationship between the layout positions set on the mount F1 in step S604 and the read images that are to be laid out at the layout positions. More specifically, the layout processing portion 92 calculates area values of the respective closed regions, and sets the numbers that indicate at what positions the closed regions are in the order of area size, as information that specifies the read images to be laid out at the layout positions. The layout processing portion 92, based on this information, determines what read images are to be laid out at the layout positions on supposition that the set numbers indicate at what numbers the images are read by the image reading portion 2. With this operation, the page layout is decided.

<Steps S510, S511>

In step S510, the control portion 9 determines whether or not a reading instruction has been input by a user operation performed on the operation portion 11. Upon determining that a reading instruction has not been input (NO in step S510), the control portion 9 performs the determination after a predetermined time passes. On the other hand, upon determining that a reading instruction has been input (YES in step S510), the control portion 9 causes the image reading portion 2 to read a document sheet.

<Step S512>

In step S512, the layout processing portion 92 lays out the read images in accordance with the page layout decided in step S606 or step S607. When the numbers written in the closed regions are used to decide the page layout, the layout processing portion 92 lays out the read images at the layout positions as shown in FIG. 8A and FIG. 8B. For example, the layout processing portion 92 lays out an image which is secondly read, at a layout position that has been set for the image. In this way, the layout processing portion 92 creates a composite image by laying out the read images read by the image reading portion 2, at the layout positions on the mount F1. FIG. 8B shows a composite image created by laying out the read images that are shown in the upper row of FIG. 8A, at the layout positions on the mount F1 that are shown in the lower row of FIG. 8A.

It is noted that when the shape of a closed region does not match the shape of a corresponding read image, the layout processing portion 92 may enlarge or reduce the read image based on the shape of the closed region. Alternatively, the layout processing portion 92 may determine a trimming range, based on the shape of the closed region, with respect to the read image after being enlarged or reduced, trim the read image by removing the trimming range, and lay out the read image after the trimming at the layout position.

<Step S513>

In step S513, the printing control portion 93 outputs the composite image created in step S511 to the image forming portion 4, causes the image forming portion 4 to perform a printing operation based on the composite image, and ends the series of processes.

As described above, in the present embodiment, when the face of the user is photographed by the photographing portion 8 together with the layout document sheet L1, the user authentication process is executed based on a face image that is included in the photographed image, and when the user is authenticated successfully, the page layout process is executed based on the image of the layout document sheet L1. This configuration improves the usability in the situation where the image combining function is used immediately after the user authentication is made. That is, according to this configuration, the user in the above-mentioned situation does not need to perform separately the work of inputting the user's identification information for the user authentication, and then the work of causing the image forming apparatus 1 to read the image of the layout document sheet L1 for use of the image combining function, but can perform these works at the same time. As a result, it is possible to improve the usability of the user authentication function and the image combining function.

Up to now, a preferable embodiment of the present invention has been described. However, the present invention is not limited to the embodiment described above, but various modifications are applicable thereto.

(1) In the above-described embodiment, an image of the layout document sheet L1 is used as a layout specification image for specifying a page layout, and a layout pattern that is used to create a composite image is input to the image forming apparatus 1 by photographing the layout document sheet L1. However, the method for specifying, to the image forming apparatus 1, a layout pattern that is used to create a composite image, is not limited to the above-mentioned one In the image forming apparatus 1 of the present modified embodiment, one or more layout patterns are stored in advance in the storage portion 7 as layout patterns that are adoptable when a composite image is created. During photographing, the user makes a gesture so as to specify a layout pattern to be adopted when a composite image is created, among the layout patterns stored in the storage portion 7, and the specified layout pattern is input to the image forming apparatus 1. The following explains this in detail. It is noted that the present modified embodiment is the same as the above-described embodiment except for the processes of steps S508 and S509 of the flowchart shown in FIG. 5. Thus in the following, only the differences from the above-described embodiment are described.

Figure 9:
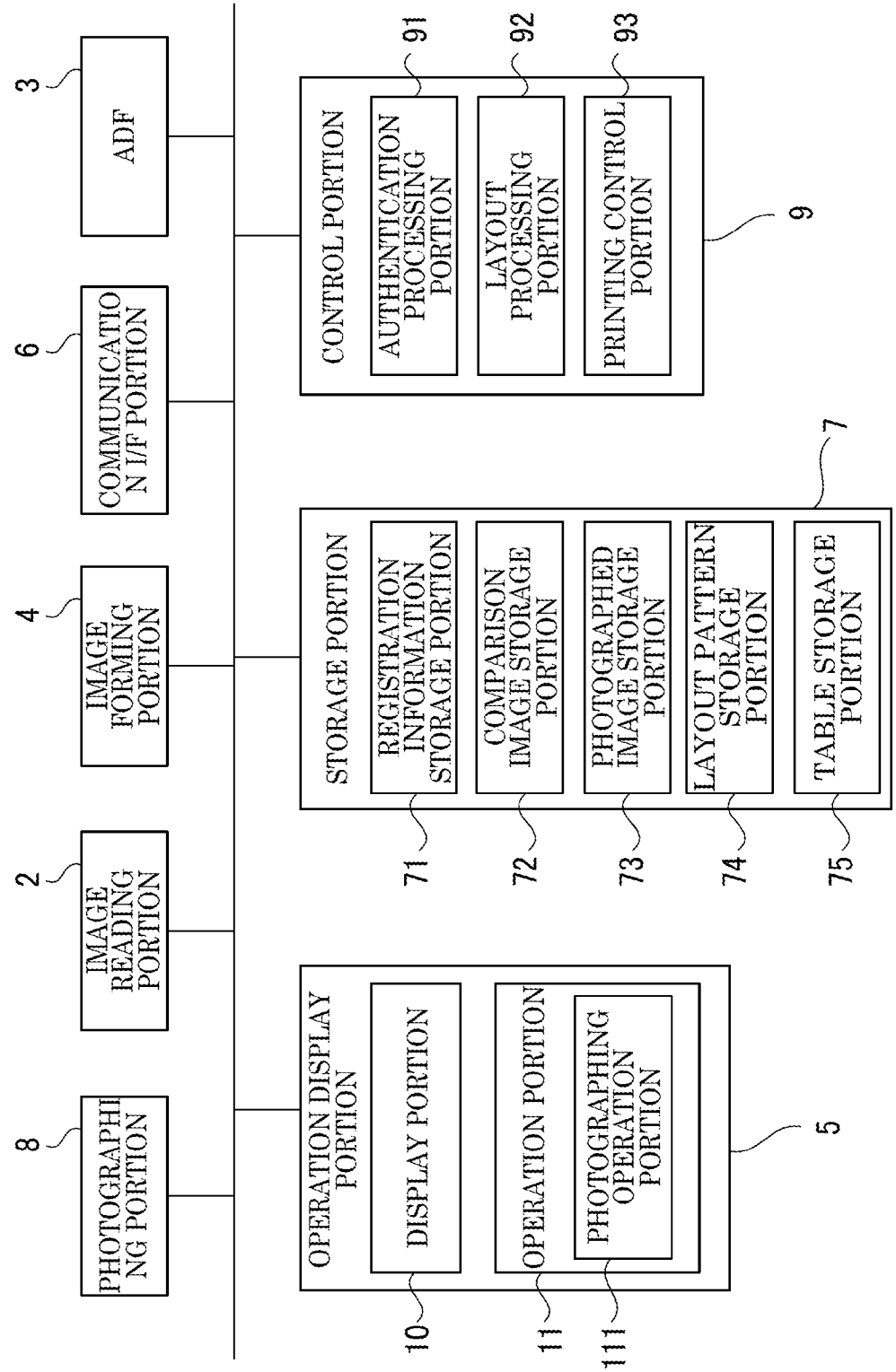
FIG. 9 is a block diagram showing an example of an electric configuration of an information processing apparatus according to a modified embodiment of the present invention.

As shown in FIG. 9, the storage portion 7 of the image forming apparatus 1 according to the present modified embodiment includes, in addition to the portions 71-73, a layout pattern storage portion 74 and a table storage portion 75.

Figure 10A:
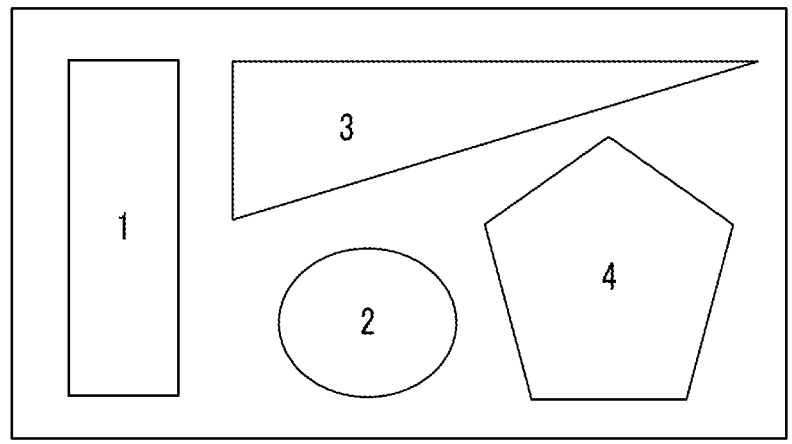
FIG. 10A is a diagram showing an example of a layout pattern.
Figure 10B:
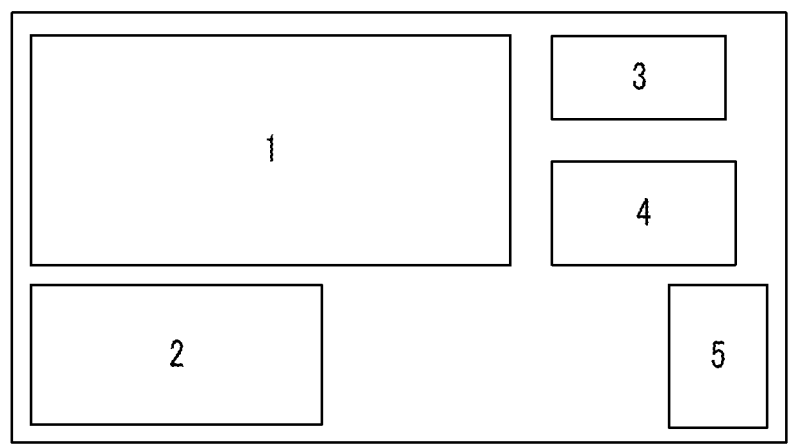
FIG. 10B is a diagram showing an example of a layout pattern.
Figure 10C:
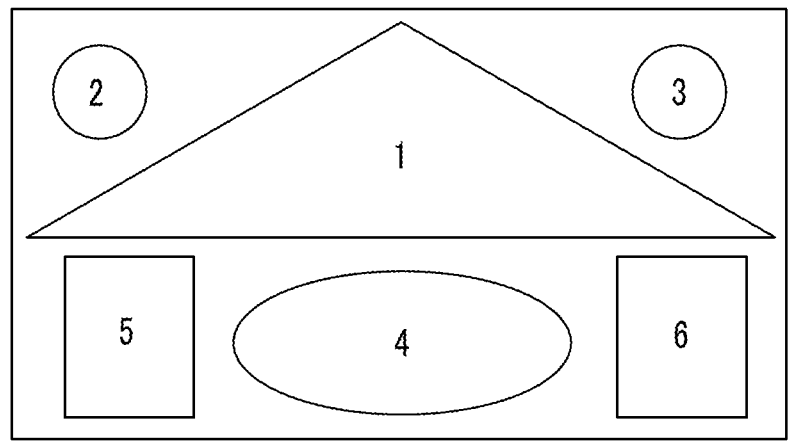
FIG. 10C is a diagram showing an example of a layout pattern.

The layout pattern storage portion 74 stores in advance a plurality of pieces of information (layout pattern information) which, as shown in FIG. 10A-FIG. 10C, indicate layout patterns for the page layout. The layout pattern information may be an image of the layout document sheet L1 as in the above-described embodiment, or may be information indicating relative positions of the layout frames on the mount F1 that are obtained from the image of the layout document sheet L1. In addition, the layout pattern information as such may be generated by the maker, may be generated by causing the photographing portion 8 to photograph a layout document sheet generated by the user, or may be generated on a personal computer. In the case where the layout pattern information is generated by the maker of the apparatus, the layout pattern information may be preinstalled in the layout pattern storage portion 74 before the shipment of the image forming apparatus 1, or may be downloaded by the user through the Internet from the home page of the maker after the shipment. The numbers indicated at the layout positions of FIG. 10A-FIG. 10C indicate the reading order.

Figure 12A:
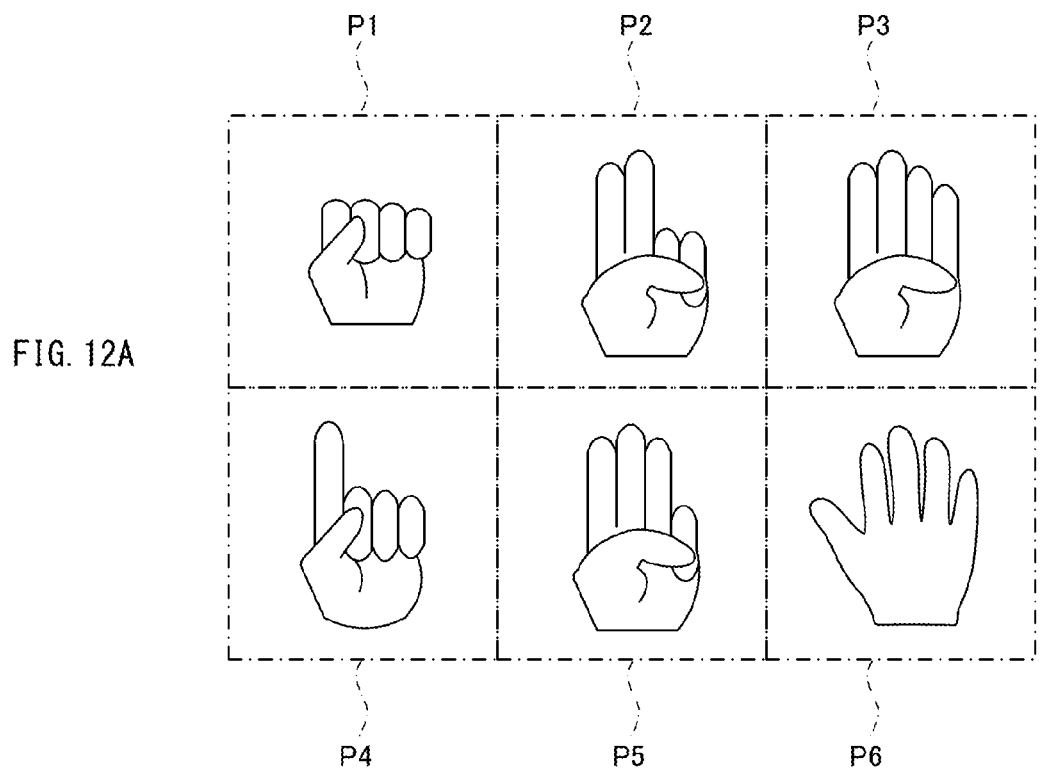
FIG. 12A shows variations of gestures.
Figure 12B:
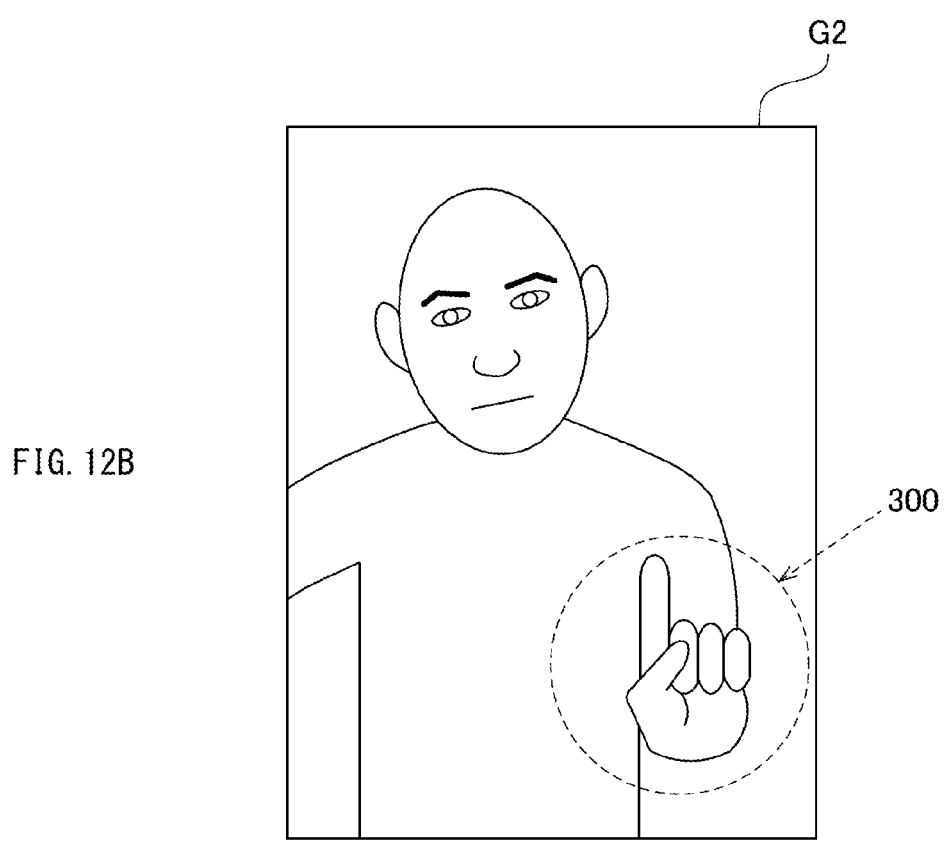
FIG. 12B is a diagram showing an example of a photographed image of a user making a gesture.

The table storage portion 75 stores, as shown in the form of a table in FIG. 12A and FIG. 12B, correspondence relationship among the image identification information for identifying comparison images, gesture identification information for identifying gestures, and layout pattern identification information for identifying layout patterns. That is, layout patterns are set in advance in correspondence with combinations of a registered user and a gesture.

The layout processing portion 92 determines, based on the photographed image G1, whether or not a person making a gesture is included in the photographed image G1. In the present modified embodiment, the gesture made by a person is a gesture made by a hand of the person as shown in FIG. 12A. The gesture has variations P1-P6 depending on the number of raised fingers. FIG. 12B shows an example of the photographed image G1 including an image of a person making such a gesture with a hand. For example, from the photographed image G1 shown in FIG. 12B, the layout processing portion 92 detects an image of a hand (see arrow 300 in FIG. 12B) and a type of a gesture made by the hand, based on the characteristic points of a hand such as the color, shape and the like.

The layout processing portion 92, by referring to the table stored in the table storage portion 75, detects the identification information of the layout pattern information based on the identification information of the detected gesture and the image identification information of a comparison image that has matched the face image of the user in the authentication performed earlier. The layout processing portion 92 then reads the layout pattern information identified by the detected identification information, from the layout pattern storage portion 74. Following this, the process of step S510 shown in FIG. 5 is performed.

As described above, in the case where the face of the user and a hand making a gesture are photographed together by the photographing portion 8, the user authentication process is performed based on the face image included in the photographed image, and after a successful authentication of the user, the page layout is decided based on the image of the hand making a gesture. As a result, as in the above-described embodiment, it is possible to improve the usability of the user authentication function and the image combining function.

(2) In the above-described embodiments, images read by the image reading portion 2 are used as the material images to be laid out. However, the material images are not limited to the read images, but may be, for example, images that have been stored in advance in the storage portion 7 of the image forming apparatus 1. In that case, the images are associated with identification information such as image numbers that are assigned in advance. The layout processing portion 92 detects a material image that is associated with a piece of identification information written in the layout frame, based on the relationship between the piece of identification information and the material image stored in the storage portion 7. The layout processing portion 92 lays out the detected material image based on the relative position of the layout frame with respect to the layout document sheet.

Figure 13A:
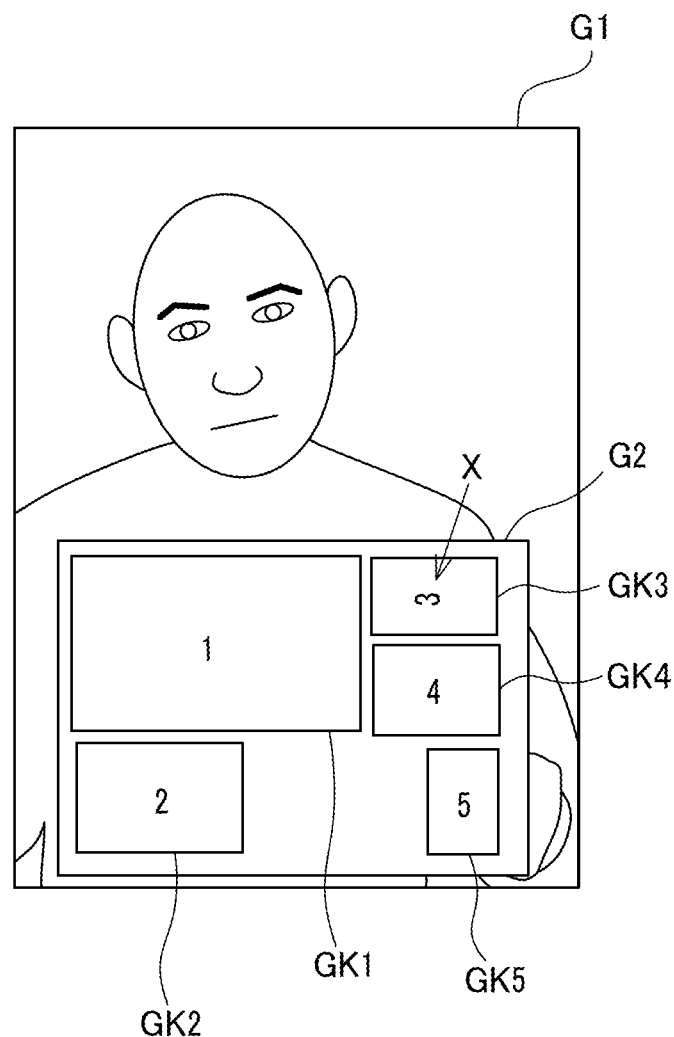
FIG. 13A is a diagram showing an example of a photographed image including an image of a layout document sheet in which a part of numbers written in closed regions is rotated 90 degrees counterclockwise.
Figure 13B:
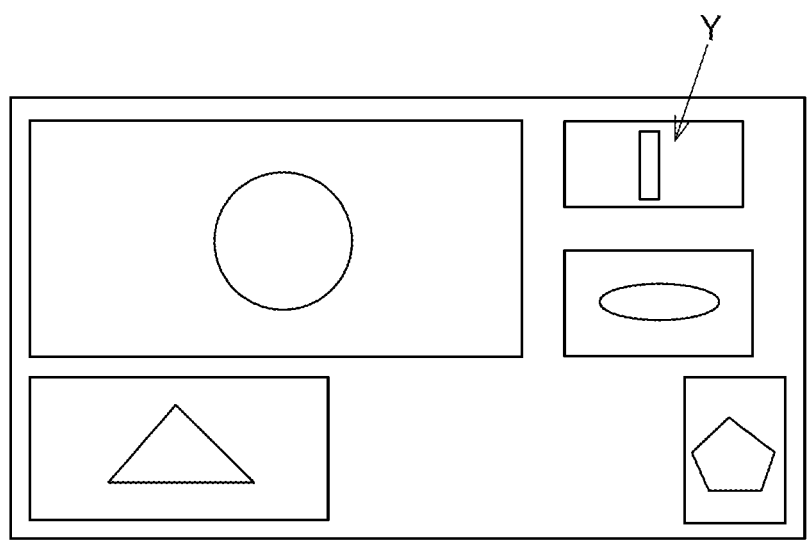
FIG. 13B is an example of a composite image created based on the photographed image shown in FIG. 13A.

(3) A layout processing portion 902 may detect an orientation (inclination) of a number written in a closed region, and lay out the material image in correspondence with the detected orientation. For example, when, as shown in FIG. 13A and FIG. 13B, number "3" written in a closed region has been rotated 90 degrees counterclockwise, the layout processing portion 902 lays out the material image at a layout position corresponding to the closed region, by rotating the material image 90 degrees counterclockwise.

(4) In the case where a layout frame written on a layout document sheet fails to form a closed region since a handwritten line written on the sheet is missing in the middle, the control portion 9 may perform a process to complement the missing part. In addition, in the case where a handwritten line is curved, the control portion 9 may perform a process for straightening the handwritten line and setting the layout position. It is noted that in the case where the handwritten line represents a circle or an oval, the control portion 9 may perform a process for correcting the irregularity of the handwritten line and setting a smooth circle or oval as the shape of the layout frame.

(5) In the image forming apparatus 1, upon input of a user operation, the control portion 9 may cause a sheet supply portion to discharge a print sheet that is required for the user to create a layout document sheet, onto a discharge portion so that the user can use the print sheet.

(6) In the above-described embodiment, the layout processing portion 92 obtains the real size of the layout document sheet L1 based on: the size of the photographed image G1 and the image G2 of the layout document sheet L1; and the distance from the photographing portion 8 to the layout document sheet L1. However, the method for calculating the real size of the layout document sheet L1 is not limited to this. For example, it is possible to adopt a method in which the real size of the layout document sheet L1 is calculated based on: a size of an image of the layout document sheet L1 included in the photographed image G1; a ratio of a size of a person in the photographed image G1 to a size of the layout document sheet L1 in the photographed image G1; and a distance from the photographing portion 8 to the layout document sheet L1.

The invention claimed is:

1. An information processing apparatus comprising:
a photographing portion;
an authentication processing portion configured to determine, based on a photographed image obtained from the photographing portion, whether or not a face image of a person is included in the photographed image, and upon determining that a face image of a person is included in the photographed image, perform an authentication process of the person based on the face image of the person; and
a layout processing portion configured to, when the authentication processing portion has successfully authenticated the person, determine whether or not a layout specification image specifying a page layout is included in the photographed image, and upon determining that a layout specification image is included in the photographed image, create a composite image by laying out one or more material images in accordance with the page layout specified by the layout specification image.

2. The information processing apparatus according to claim 1, wherein
the layout specification image is an image of a layout document sheet, the image of the layout document sheet including one or more layout frames and image specification information, the layout frames constituting the page layout, the image specification information specifying the material images to be laid out in correspondence with the layout frames.

3. The information processing apparatus according to claim 2 further comprising:

an image reading portion configured to read an image from a document sheet, wherein the material images are read images that are images read by the image reading portion, the image specification information being numbers indicating an order in which the read images are read by the image reading portion, and the numbers indicating the order in which the read images are read are respectively written in the layout frames, and the layout processing portion lays out the read images in accordance with the numbers, based on relative positions of layout frames with respect to the layout document sheet.

4. The information processing apparatus according to claim 3, wherein the layout processing portion detects orientations of the numbers written in the layout frames, and lay out the material images in correspondence with the detected orientations.

5. The information processing apparatus according to claim 2 further comprising:

an image storage portion storing the material images together with identification information thereof, wherein the image specification information is the identification information of the material images stored in the image storage portion, and the layout processing portion detects the material images that are associated with the identification information written in the layout frames, based on relationship between the identification information and the material images stored in the image storage portion, and lays out the detected material images based on the relative positions of the layout frames with respect to the layout document sheet.

6. The information processing apparatus according to claim 2, wherein the layout processing portion detects a real size of the layout document sheet based on: a distance from the photographing portion to the layout document sheet; and at least one of a size of the image of the layout document sheet included in the photographed image, and a ratio of a size of a person in the photographed image to a size of the layout document sheet in the photographed image, and determines a size of the composite image based on the detected real size of the layout document sheet.

7. The information processing apparatus according to claim 1, wherein the layout specification image is an image of a person who is making a predetermined gesture, the information processing apparatus further comprising:

a layout storage portion storing correspondence relationship between types of gestures and types of page layouts, wherein the layout processing portion detects a page layout that corresponds to a gesture made by the person included in the photographed image, based on the correspondence relationship between types of gestures and types of page layouts stored in the layout storage portion, and lays out the material images in accordance with the detected page layout.

8. An information processing method comprising:

a first step of determining, based on a photographed image obtained from a photographing portion, whether or not a face image of a person is included in the photographed image, and upon determining that a face image of a person is included in the photographed image, performing an authentication process of the person based on the face image of the person; and a second step of, when the first step has successfully authenticated the person, determining whether or not a layout specification image specifying a page layout is included in the photographed image, and upon determining that a layout specification image is included in the photographed image, creating a composite image by laying out one or more material images in accordance with the page layout specified by the layout specification image.

* * * * *